(12) United States Patent
Zhong et al.

(10) Patent No.: US 11,680,472 B2
(45) Date of Patent: Jun. 20, 2023

(54) FRACTURING SYSTEM

(71) Applicant: YANTAI JEREH PETROLEUM EQUIPMENT & TECHNOLOGIES CO., LTD., Yantai (CN)

(72) Inventors: Jifeng Zhong, Yantai (CN); Liang Lv, Yantai (CN); Shuzhen Cui, Yantai (CN); Shouzhe Li, Yantai (CN); Yipeng Wu, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 17/747,916

(22) Filed: May 18, 2022

(65) Prior Publication Data

US 2022/0282606 A1    Sep. 8, 2022

Related U.S. Application Data

(63) Continuation of application No. 17/167,391, filed on Feb. 4, 2021, and a continuation of application No. PCT/CN2020/137135, filed on Dec. 17, 2020.

(30) Foreign Application Priority Data

Nov. 24, 2020   (CN) .......................... 202022752009.1

(51) Int. Cl.
    *E21B 43/26*    (2006.01)
    *G01V 99/00*    (2009.01)
    (Continued)

(52) U.S. Cl.
    CPC .............. *E21B 43/26* (2013.01); *G01V 1/288* (2013.01); *G01V 1/42* (2013.01); *G01V 99/005* (2013.01); *G01V 2210/646* (2013.01)

(58) Field of Classification Search
    CPC .......... E21B 43/26; G01V 1/288; G01V 1/42; G01V 99/005; G01V 2210/646
    See application file for complete search history.

(56) References Cited

U.S. PATENT DOCUMENTS 3,794,377 A    2/1974  Wachsmuth et al.
3,815,965 A    6/1974  Ostwald
(Continued)

FOREIGN PATENT DOCUMENTS

CN    1154765 A      7/1997
CN    102704895 A   10/2012
(Continued)

OTHER PUBLICATIONS

International Search Report dated Aug. 13, 2021, for International Application No. PCT/CN2020/137300, 5 pages.
(Continued)

*Primary Examiner* — Yoshihisa Ishizuka

(57) ABSTRACT

The present disclosure relates to a fracturing system comprising a functional unit, an electricity supply unit, and an energy storage unit. The functional unit is configured to perform procedures of fracturing operations. The electricity supply unit is electrically connected with the functional unit and is configured to supply electrical energy to the functional unit. The energy storage unit is respectively electrically connected with the electricity supply unit and the functional unit, and is configured to store electrical energy from the electricity supply unit and supply electrical energy to the functional unit.

20 Claims, 8 Drawing Sheets

(51) Int. Cl.
*G01V 1/42* (2006.01)
*G01V 1/28* (2006.01)

(56) References Cited

U.S. PATENT DOCUMENTS

| | | | |
|---|---|---|---|
| 4,201,523 | A | 5/1980 | Olofsson |
| 4,793,775 | A | 12/1988 | Peruzzi et al. |
| 5,519,300 | A | 5/1996 | Leon et al. |
| 5,767,591 | A | 6/1998 | Pinkerton |
| 5,846,056 | A | 12/1998 | Dhindsa et al. |
| 6,134,878 | A | 10/2000 | Amako et al. |
| 8,731,793 | B2 | 5/2014 | Barbir et al. |
| 10,648,311 | B2 | 5/2020 | Oehring et al. |
| 10,865,624 | B1 | 12/2020 | Cui et al. |
| 10,873,099 | B1 | 12/2020 | Gurunathan et al. |
| 10,914,155 | B2 | 2/2021 | Oehring et al. |
| 11,109,508 | B1 | 8/2021 | Yeung et al. |
| 11,125,066 | B1 | 9/2021 | Yeung et al. |
| 11,208,878 | B2 | 12/2021 | Oehring et al. |
| 11,220,895 | B1 | 1/2022 | Yeung et al. |
| 11,378,008 | B2 | 7/2022 | Yeung et al. |
| 11,391,136 | B2 | 7/2022 | Coli et al. |
| 11,434,737 | B2 | 9/2022 | Oehring et al. |
| 11,459,863 | B2 | 10/2022 | Robinson et al. |
| 11,542,786 | B2 | 1/2023 | Hinderliter et al. |
| 2003/0007369 | A1 | 1/2003 | Gilbreth et al. |
| 2003/0064858 | A1 | 4/2003 | Saeki et al. |
| 2005/0093496 | A1 | 5/2005 | Tokunou et al. |
| 2005/0241884 | A1 | 11/2005 | Ghanemi et al. |
| 2010/0045237 | A1 | 2/2010 | Liu |
| 2010/0135840 | A1 | 6/2010 | Fujimoto et al. |
| 2013/0184884 | A1* | 7/2013 | More ............... F03D 9/12 290/44 |
| 2013/0255153 | A1 | 10/2013 | Sasaki et al. |
| 2014/0167810 | A1 | 6/2014 | Neti et al. |
| 2014/0219824 | A1 | 8/2014 | Burnette |
| 2015/0260794 | A1 | 9/2015 | Athikessavan et al. |
| 2015/0349387 | A1* | 12/2015 | Inaba ............... H02J 7/0048 700/297 |
| 2016/0041066 | A1 | 2/2016 | Patenaude et al. |
| 2016/0121871 | A1 | 5/2016 | Lee |
| 2016/0358311 | A1 | 12/2016 | Chen et al. |
| 2017/0159425 | A1 | 6/2017 | Wood et al. |
| 2017/0285062 | A1 | 10/2017 | Kim |
| 2018/0145511 | A1* | 5/2018 | Biellmann ............ H02J 3/381 |
| 2018/0328157 | A1 | 11/2018 | Bishop |
| 2019/0100989 | A1 | 4/2019 | Stewart et al. |
| 2019/0128265 | A1 | 5/2019 | Washio et al. |
| 2019/0169971 | A1 | 6/2019 | Oehring et al. |
| 2019/0195292 | A1 | 6/2019 | Pan et al. |
| 2020/0040878 | A1 | 2/2020 | Morris |
| 2020/0049136 | A1 | 2/2020 | Stephenson |
| 2020/0325760 | A1 | 10/2020 | Markham |
| 2021/0040830 | A1 | 2/2021 | Mu et al. |
| 2021/0095552 | A1 | 4/2021 | Oehring et al. |
| 2021/0095648 | A1 | 4/2021 | Buckley et al. |
| 2021/0102451 | A1 | 4/2021 | Robinson et al. |
| 2021/0102530 | A1 | 4/2021 | Pruitt et al. |
| 2021/0108489 | A1* | 4/2021 | Shampine ........... E21B 41/0085 |
| 2021/0199161 | A1 | 7/2021 | Eto et al. |
| 2021/0310341 | A1* | 10/2021 | Sherman ................ F04B 47/00 |
| 2022/0004179 | A1 | 1/2022 | Badkoubeh |
| 2022/0018232 | A1 | 1/2022 | Oehring et al. |
| 2022/0213777 | A1 | 7/2022 | Cui et al. |
| 2022/0364448 | A1 | 11/2022 | Oehring et al. |

FOREIGN PATENT DOCUMENTS

| | | |
|---|---|---|
| CN | 103456141 A | 12/2013 |
| CN | 103913193 A | 7/2014 |
| CN | 105337397 A | 2/2016 |
| CN | 105352588 A | 2/2016 |
| CN | 107345857 A | 11/2017 |
| CN | 108360818 A | 8/2018 |
| CN | 208337176 U | 1/2019 |
| CN | 109765484 A | 5/2019 |
| CN | 110932362 A | 3/2020 |
| CN | 210745048 U | 6/2020 |
| CN | 112993965 A | 6/2021 |
| CN | 113417737 A | 9/2021 |
| CN | 214227909 U | 9/2021 |
| CN | 214786070 U | 11/2021 |
| CN | 215621353 U | 1/2022 |
| EP | 2290776 A1 | 3/2011 |
| KR | 20210087308 A | 7/2021 |

OTHER PUBLICATIONS

International Search Report dated Aug. 23, 2021, for International Application No. PCT/CN2020/137135, 4 pages.
Non-Final Office Action for U.S. Appl. No. 17/155,966 dated Jul. 28, 2022.
Non-Final Office Action for U.S. Appl. No. 17/733,922 dated Sep. 21, 2022.
Non-Final Office Action for U.S. Appl. No. 17/884,358 dated Dec. 8, 2022.
Final Office Action for U.S. Appl. No. 17/733,922 dated Dec. 28, 2022.
Written Opinion and International Search Report for PCT Application No. PCT/CN2022/076321 dated Nov. 16, 2022.
Non-Final Office Action for U.S. Appl. No. 17/167,391 dated Feb. 17, 2023.

* cited by examiner

FRACTURING SYSTEM

CROSS-REFERENCE TO RELATED APPLICATIONS

The present application is a continuation application of U.S. patent application Ser. No. 17/167,391, filed on Feb. 4, 2021, entitled "FRACTURING SYSTEM," which claims priority to Chinese Patent Application No. 202022752009.1, filed on Nov. 24, 2020. The present application is also a continuation application of International Application No. PCT/CN2020/137135 filed on Dec. 17, 2020, which claims priority to Chinese Patent Application No. 202022752009.1, filed on Nov. 24, 2020. The entire contents of all of the above-identified applications are incorporated herein by reference in their entirety.

FIELD OF INVENTION

The present disclosure generally relates to a fracturing system.

BACKGROUND

Fracturing is a major measure for stimulating oilfield productions. Limited by issues such as construction cost and environmental pollution, electrical equipment has been gradually applied to provide driving force for oilfield site construction, that is, electric driving fracturing construction. For example, the fracturing system can be connected to and powered by electricity grid; or electricity generating equipment can be mounted on site to supply electrical energy; or both the electricity grid and the electricity generating equipment can be jointly applied to supply combined electrical energy to the fracturing system. However, there are still the following problems in fracturing operation using electric drive:

1. At present, gas turbines are widely used to drive generators for electricity generation, which has high thermal efficiency and good economy. However, gas turbines usually need to be equipped with black-start devices to start the generator. Multiple black-starts (usually power equipment driven by diesel engines) are required when there are multiple generators, leading to redundancy of start devices. In addition, diesel fuel is also required. These problems increase variety and complexity of equipment at the well site.

2. The scale of fracturing operation is usually large. For example, the power of shale gas fracturing can usually reach 20,000-50,000 WHP. If all equipment is driven by electrical energy, power about 25 MW is needed. Therefore, it is necessary to ensure sufficient generator power. The placement of gas treatment equipment should also be considered when arranging electricity generating equipment at the well site. Considering safety problems (such as operation failure caused by abnormal power failure, which leads to failure of expected effect, even safety accidents), it is also necessary to arrange backup electricity generating equipment. All of these conditions result in a relatively large area occupied by electricity generating equipment. In addition, flattening ground is needed to arrange electricity generating equipment, however, most well sites are located in the wild, even in mountains, where flattening ground needs additional cost to obtain This further increases the cost of fracturing operations.

3. Fracturing operation site usually keeps continuous high-power operations lasting about 2-4 hours. In the clearance period, inspection, wellhead switching, perforation and other work are performed, then high-power operations are performed again. In other words, the electric load of fracturing operation fluctuates greatly. If the generator set is kept idling during the clearance period when almost no electrical energy is needed, it will cause a waste of fuel. Otherwise, if some or all of the generators are started and stopped frequently along with the fracturing construction process, it may lead to high cost and reduction of the generator's service life.

4. There are limitations to the power of a single generator. For example, when operating at a high temperature the electricity generation capacity of the gas turbine will decrease. Therefore, overload risks may occur to electricity generating equipment at the well site under some working conditions.

5. Fuel supply issues should be usually considered when electricity generating equipment is driven by internal combustion engines. The consumption of liquid or gas fuel is large. Although multiple generators can be backed up, fuel supply systems and pipelines are usually unable or difficult to be backed up, especially for gas that requires on-site treatment, such as wellhead gas, there being risk of fuel supply interruption. In order to solve these problems, measures such as temporary storage of fuel needs to be considered at well site.

6. When the fracturing system is powered by the electricity grid, there is limitation to the fluctuation of electric power supplied by the electricity grid. Moreover, the stability of construction operation is directly affected by the stability of electricity grid, thus there is a relatively large risk of stability.

7. Some well sites are located in areas where there are usually no ready-made electricity supply facilities and need to be prepared in advance, resulting in higher costs and cycle costs.

8. In the case of offshore platform operations, there are problems of limited placement area and energy supply.

Therefore, there is a need for a fracturing system to at least partly solve the foregoing problems.

SUMMARY

An objective of the present disclosure is to provide a fracturing system.

According to an aspect of the present disclosure, a fracturing system includes: a functional unit configured to perform procedures of fracturing operations; an electricity supply unit electrically connected to the functional unit, the electricity supply unit being configured to supply electrical energy to the functional unit; and an energy storage unit electrically connected respectively with the electricity supply unit and the functional unit, the energy storage unit being configured to store electrical energy from the electricity supply unit and supply electrical energy to the functional unit.

According to the present disclosure, the fracturing system includes an energy storage unit, which can store surplus electrical energy of the electricity supply unit and then supply electrical energy to the whole fracturing system when needed, thereby playing a role of energy storage and peak regulation, enabling the generator set and the like to maintain economic working condition for a long time, being safer and more stable, thus improving the efficiency and economy of the generator set. In addition, it is possible to generate electricity from non-carbon sources for fracturing operations. Moreover the fracturing system further minimizes the use of internal combustion engines, which is more environment-friendly. The present disclosure can also reduce the number of generator sets and the space occupied by the generator sets so as to reduce the construction cost of fracturing operations.

In one embodiment, the electricity supply unit includes a generator set, and the energy storage unit is configured to supply electrical energy to the generator set.

According to the present disclosure, the energy storage unit can provide necessary electrical energy for starting the generator set before the generator set starts.

In one embodiment, the fracturing system further includes a switch cabinet, a transformation unit, and a frequency conversion unit. The electricity supply unit is electrically connected with the functional unit via the switch cabinet, the transformation unit, and the frequency conversion unit. Wherein the energy storage unit is electrically connected with the functional unit through the switch cabinet, the transformation unit and the frequency conversion unit, or the energy storage unit is electrically connected with the functional unit via the transformation unit and the frequency conversion unit.

According to the present disclosure, the current supplied by the electricity supply unit to the functional unit can be controlled centrally, and the current can be transformed, rectified, and converted into the current that is suitable for the functional unit. In addition, the mode of electrical connection between the energy storage unit and the functional unit can be flexibly selected according to actual needs.

In one embodiment, the frequency conversion unit includes a rectifier module and an inverter module, wherein the transformation unit is integrated with the rectifier module, the inverter module is integrated with a power element of the functional unit, the rectifier module is electrically connected with the inverter module via a DC bus, and the energy storage unit is electrically connected with the DC bus or the inverter module.

According to the present disclosure, the rectifier module and the inverter module are arranged as two separate parts, and the output end of the energy storage unit can be selectively connected to the DC bus or the inverter module according to needs, thereby enhancing the flexibility of the arrangement.

In one embodiment, the charging interface of the energy storage unit is electrically connected with the rectifier module.

According to the present disclosure, the current input to the energy storage unit can be rectified with an appropriate frequency and voltage.

In one embodiment, the electricity supply unit, the energy storage unit, and the functional unit are electrically connected in series.

According to the present disclosure, the energy storage unit can form a part of the circuit through which electrical energy is supplied from the electricity supply unit to the functional unit, thus increasing the selectivity of the arrangement.

In one embodiment, the energy storage unit includes a battery module, a switch, a battery management module, a charging interface, and an electric supply interface.

According to the present disclosure, the energy storage unit can be conveniently controlled and managed through a battery management module as well as a switch.

In one embodiment, the energy storage unit further includes an additional rectifier module electrically connected between the charging interface and the battery module, or the energy storage unit further includes an additional inverter module, the electric supply interface includes an AC electric supply interface, wherein the additional inverter module is electrically connected between the battery module and the AC electric supply interface.

According to the present disclosure, the additional rectifier module can rectify the current input to the energy storage unit into direct current, or the energy storage unit can output alternating current, and the additional inverter module can convert the current output by the energy storage unit with appropriate frequency and voltage.

In one embodiment, the energy storage unit further includes a DC/DC converter electrically connected between the charging interface and the battery module and/or between the battery module and the electric supply interface.

According to the present disclosure, the effect of increasing or decreasing of DC voltage can be achieved inside the energy storage unit.

In one embodiment, the electric supply interface includes a DC electric supply interface which is electrically connected with the battery module directly.

According to the present disclosure, the energy storage unit can output direct current.

In one embodiment, the energy storage unit includes a bidirectional converter, and the charging interface and the electric supply interface are respectively electrically connected with the battery module via the bidirectional converter.

According to the present disclosure, the bidirectional converter has a function of rectification and inversion, thereby controlling the charging and discharging function of the energy storage unit.

In one embodiment, the fracturing system further includes a centralized control unit which is in communication connection with the functional unit and the energy storage unit in a wired and/or wireless manner, and the centralized control unit is used for monitoring and/or controlling working parameters of the functional unit and the energy storage unit.

According to the present disclosure, the working parameters of key equipment can be controlled, and the energy storage unit can be monitored and protected.

In one embodiment, the centralized control unit is configured to send out alarm information and/or reduce the power consumption of the functional unit when voltage, current and/or frequency of power supply to the functional unit deviate from a predetermined range.

According to the present disclosure, when the energy storage unit and/or the electricity supply unit fails, the electrical energy transmitted to the functional unit can be reduced to avoid safety accidents, at the same time, an alarm message can be sent for caution.

In one embodiment, the centralized control unit is configured to automatically control the energy storage unit to supply electrical energy to the electricity supply unit, the centralized control unit and/or the functional unit when power supply from the electricity supply unit is cut off.

According to the present disclosure, the switching between the power supply from the electricity supply unit and from the energy storage unit can be automatically realized.

In one embodiment, the centralized control unit is further configured to send out prompt information including working duration information prejudged according to remaining battery level of the energy storage unit and working power of the functional unit.

According to the present disclosure, it is possible to allow the operators to take necessary measures to continuously complete operations, or temporarily reduce power consumption, etc., so as to avoid operation accidents such as well blockage caused by sudden shutdowns.

In one embodiment, the centralized control unit controls the energy storage unit to operate in the following manner: all the battery modules are charged at the same time; or all the battery modules supply electrical energy at the same time; or some of the battery modules supply electrical energy and the others are charged.

According to the present disclosure, it is possible to select working mode of the energy storage unit flexibly according to needs.

In one embodiment, the centralized control system is configured to disconnect the electrical connection for charging the energy storage unit when voltage, current and/or frequency for charging the energy storage unit deviate from a predetermined range.

According to the present disclosure, the charging circuit can be cut off when there are errors during charging in order to protect the energy storage unit.

In one embodiment, the energy storage unit is arranged on a carrier.

According to the present disclosure, the energy storage unit can be transported easier. The carrier includes: auxiliary lifting appliance, semi-trailer, chassis vehicle, rail vehicle, base for lifting, skid, etc. which can transport the energy storage unit to a power station located off the well site for centralized charging.

In one embodiment, the electricity supply unit includes at least one of an electricity grid, a diesel generator set, a turbine generator set, a gas generator set, a nuclear reactor generator set, a photovoltaic electricity generating equipment, wind turbine electricity generating equipment and a fuel cell, wherein the fuel cell can be a natural gas fuel cell, a hydrogen fuel cell, and the like.

According to the present disclosure, it is possible to select the specific form of the appropriate power supply unit according to actual needs.

BRIEF DESCRIPTION OF THE DRAWINGS

For the sake of better understanding on the above and other objectives, features, advantages, and functions of the present disclosure, the preferred embodiments are provided with reference to the drawings. The same reference symbols refer to the same components throughout the drawings. It would be appreciated by those skilled in the art that the drawings are merely provided to illustrate preferred embodiments of the present disclosure, without suggesting any limitation to the protection scope of the present disclosure, and respective components therein are not necessarily drawn to scale.

LIST OF REFERENCE SYMBOLS 10 functional unit (or referred to as fracturing equipment)
20 electricity supply unit (or referred to as electricity supplier)
30 energy storage unit (or referred to as energy storage)
40 switch cabinet
50 transformation unit (or referred to as transformer)
60 frequency conversion unit (or referred to as frequency converter)
61 rectifier module (or referred to as rectifier)
62 inverter module (or referred to as inverter)
21 non-carbon energy electricity generating module (or referred to as non-carbon energy electricity generator)
22 carbon energy electricity generating module (or referred to as carbon energy electricity generator)
100/200/300/400/500/600/700 fracturing system

DETAILED DESCRIPTION OF EMBODIMENTS

Reference now will be made to the drawings to describe embodiments of the present disclosure. What will be described herein are only preferred embodiments according to the present disclosure. On the basis, those skilled in the art would envision other embodiments of the present disclosure which all fall into the scope of the present disclosure.

Figure 16:
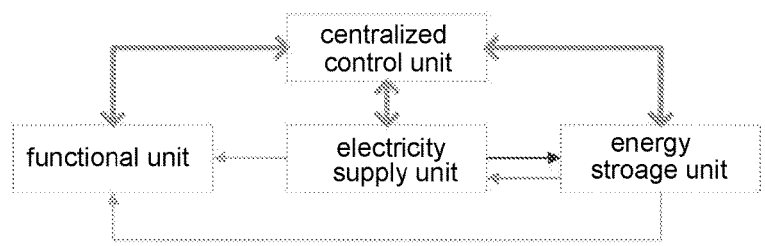
FIG. 16 is a system block diagram of the fracturing system according to the present invention.

The present disclosure provides a fracturing system for fracturing operation at oil and gas fields. As shown in FIG. 16, according to the present disclosure, the fracturing system mainly comprises a functional unit, an electricity supply unit, an energy storage unit, and a centralized control unit. Wherein the functional unit mainly includes functional equipment and/or components for performing each procedure of the whole fracturing operation, for example, the functional units may include mixing equipment, sand blender, sand conveyor, fracturing equipment, or cementing equipment and batch mixing equipment used in cementing operations, or electric drive equipment in drilling operation, etc. Wherein mixing equipment, sand blender, sand conveyor, fracturing equipment and the like may include power elements to provide driving force, all or most of which are electric motors. In other words, according to the present disclosure, all or most of the fracturing system is electrically driven.

The electricity supply unit is electrically connected with each electrically driven power element of the functional unit and provides electrical energy so that each part of the functional unit can realize its function. Specifically, the electricity supply unit may include one of an electricity grid, a diesel generator set, a turbine generator set, a gas generator set, a nuclear reactor generator set, photovoltaic generation equipment, a wind power plant and a fuel cell or a combination of one or more of the above-mentioned. Those skilled in the art can flexibly select the specific form of the electricity supply unit according to actual situation of the well site. In addition, the electricity supply unit can also be electrically connected with the centralized control unit to supply electrical energy to the centralized control unit.

The centralized control unit is usually located in a fracturing instrument vehicle or a remote command center, and can be in communication connection with the functional unit in a wired or wireless manner. The centralized control unit can be respectively in communication connection with the functional unit, the electricity supply unit, and the energy storage unit. Therefore, the centralized control unit can be used for monitoring or controlling pressure of fracturing equipment, temperature, and rotational speed parameters of key devices at the well site, as well as running parameters, such as rotational speed of electric motor of fracturing pump vehicle, rotational speed of electric motor for heat dissipation of fracturing equipment, rotational speed of electric motor of sand blender and mixing equipment. The centralized control unit may have a local control mode or a remote control mode.

The energy storage unit is electrically connected with the electricity supply unit, the functional unit, and the centralized control unit respectively. On the one hand, the energy storage unit can store electrical energy from the electricity supply unit; on the other hand, the energy storage unit can also be used as a backup of the electricity supply unit or as a supplement to supply electrical energy to the functional unit.

A specific charging process can be as follows:

For example, in an embodiment that the electricity supply unit includes a generator set, the fracturing equipment of the functional unit is configured to stop working during clearance of fracturing operation, while the generator set still keeps a working condition of high generating efficiency to charge the energy storage unit, so as to avoid frequent start and stop of the generator set or idling running of the generator set which will lead to a waste of fuel and energy.

Alternatively, during the fracturing operation process, surplus electrical energy can be stored in the energy storage unit when generating capacity of the generator set is higher than electric power needed in actual working condition of the functional unit, thereby enabling the generator set to keep a steady and efficient running condition.

A specific electrical energy supply process can be as follows:

For example, the need for electric power is low in the clearance of the fracturing operation or in a preparation stage of pre-fracturing operation when most of the fracturing equipment stop working. Hence the fracturing operation can be power supplied by the energy storage unit directly with the generator set being shut down and the electricity grid disconnected.

Alternatively, when the generator set or the electricity grid fails to provide electrical energy for the electrical equipment, the energy storage unit can be used to provide electrical energy so as to ensure the normal operation of the electrical equipment, thereby avoiding interruption of fracturing operation due to power supply problem, and further avoiding safety problems such as well plugging caused by interruption of fracturing operation.

Alternatively, the energy storage unit can also supply electrical energy to other important communication, monitoring and control equipment such as centralized control unit, control module of generator set, control module of other equipment, and monitoring system of well site, etc., so as to ensure the reliability of key systems such as communication and control system when the power equipment or the electricity grid fail.

Alternatively, under the condition that the electric capacity of the energy storage unit is large enough to meet the power demand during fracturing operation, the energy storage unit or the electricity supply unit can be selectively used to alternately provide electrical energy for fracturing operation. For example, when the air temperature is appropriate or under other conditions that are suitable for internal combustion engine power generation, the generator set can be used to supply electrical energy, while during low power consumption periods, the electricity grid, photovoltaic and wind turbine can be used to supply electrical energy, with the energy storage unit being charged at chosen time meanwhile. Under some other conditions such as the air temperature is too high to use the above-mentioned power generation methods to supply electrical energy, or during the period of peak electricity consumption, the energy storage unit can be used for electric energy supply so as to enhance economic efficiency. At this time, a part of the energy storage unit can be used as a backup power supply to ensure the safety and stability of power supply at the well site.

FIGS. 1 to 6 respectively show various configurations of an energy storage unit for a fracturing system according to the present disclosure.

Figure 1:
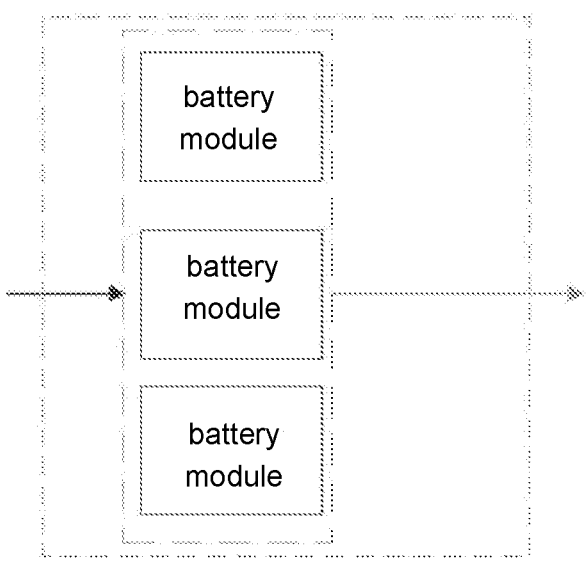
FIG. 1 is a schematic diagram of a first configuration of an energy storage unit used in a fracturing system according to the present disclosure.

As shown in FIG. 1, the energy storage unit includes a battery module for storing electrical energy. The battery module may specifically be chemical batteries and/or super capacitors or a combination of one or more of the above, etc. Wherein the chemical battery may be, for example, a lithium ion battery, a sodium ion battery, or a lithium iron phosphate battery, etc.

In addition, although not shown in the drawings, it can be understood that in order to realize the functions of storing and supplying electrical energy by the battery module, the energy storage unit also includes a battery management module, a charging interface, an electric supply interface, a switch, and the like. The battery module can be electrically connected with the electricity supply unit via the charging interface and can be electrically connected with components needing power supply via the electric supply interface. The switch is used to control the on-off state of the electrical connection between the energy storage unit and other units. The battery management module can detect the key parameters of the battery module so as to protect the energy storage unit, such as under-voltage protection, overload protection, overcurrent protection, short circuit protection and overtemperature protection, etc. The battery management module may also have a minimum protected battery level. For example, the battery management module may be set a minimum protected battery level to ensure that the battery module stores sufficient backup battery level or achieve the purpose of protecting the battery. When approaching, reaching, or falling below the set minimum protected battery level, the battery management module generates a corresponding instruction or cuts off the output power supply, such as sending out a prompt message.

In addition, the battery management module can be in communication connection with the centralized control unit of the fracturing system through wired, wireless, Ethernet and other communication methods. The centralized control unit can control the charging and power supply operation of the energy storage unit in a local control mode or a remote control mode. For example, the centralized control unit can control part of the battery modules of the energy storage unit to be charged while the other part of the battery modules to supply electrical energy; or the centralized control unit can control all battery modules to be charged at the same time; or the centralized control unit can control all battery modules to supply electrical energy at the same time. A charging protection program can also be set. When the frequency, current, voltage and temperature of charging are abnormal, the charging protection program can cut off the charging power supply to avoid safety accidents.

In addition, the centralized control unit can monitor the parameters of the energy storage unit such as battery level, temperature, current, voltage, etc. and can display these parameters to the operator. When the electricity supply unit or the energy storage unit is abnormal, the centralized control unit can judge the abnormal situation according to collected signals, and then display alarm information, or prompt operation precautions, or automatically control the functional unit, such as reducing power consumption, specifically, reducing VFD output current or closing part or all of VFD output, or reducing flushing times of some fracturing pumps, etc. When an emergency occurs at the well site, the centralized control unit can be used for emergency shutdown. The centralized control unit can also turn off an output switch of the electricity supply unit or the electricity supply unit itself through a remote stop button or a remote stop command on the touch screen, specifically, for example, stopping running of turbine generator, or turning off an output switch of the energy storage unit or the energy storage unit itself, or stopping output current of VFD.

When the electricity supply unit stops supplying power due to emergency shutdown, the centralized control unit can automatically adjust power supply function of the energy storage unit according to preset conditions. For example, when turbine generator stops running, the centralized control unit can control the energy storage unit to supply power to the turbine engine, the centralized control unit, and the like in an automatic or manual manner through a remote control mode or a local control mode so as to ensure engine lubrication, heat dissipation and stability of the centralized control unit.

When the electricity supply unit stops supplying electrical energy due to an emergency, the centralized control unit can adjust the power supply function of the energy storage unit according to a preset program in order to continue supplying power for the functional units necessary for operation at the well site, at the same time, the centralized control unit sends out prompt information to operator. The prompt information can include a prejudged operation duration information according to operation situation (inferring electrical energy consumption based on current power consumption or preset operating parameters of different stages of functional units), so that the operators can take necessary measures to continuously complete the operation, or temporarily reduce power consumption, etc., to avoid operation accidents such as well blockage caused by sudden shutdown.

Figure 2:
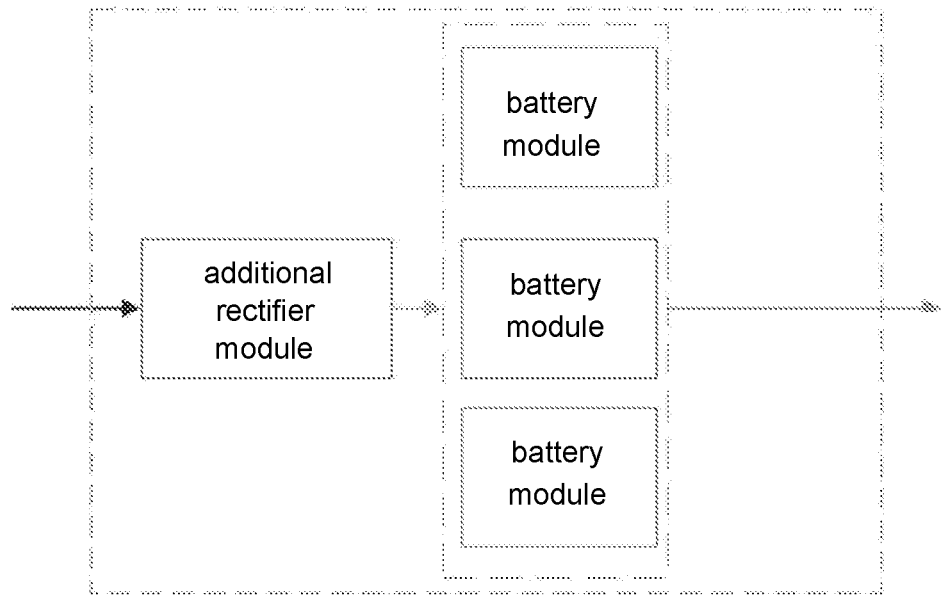
FIG. 2 is a schematic diagram of a second configuration of an energy storage unit used in a fracturing system according to the present disclosure.

FIG. 2 shows a second configuration of energy storage unit. Compared with the energy storage unit shown in FIG. 1, the energy storage unit shown in FIG. 2 further includes an additional rectifier module electrically connected between the charging interface and the battery module. The additional rectifying module can rectify charging current input to the energy storage unit, changing it from alternating current into direct current and providing sufficient charging voltage to the battery module. That is, the additional rectifying module can play a role of charging.

Figure 3:
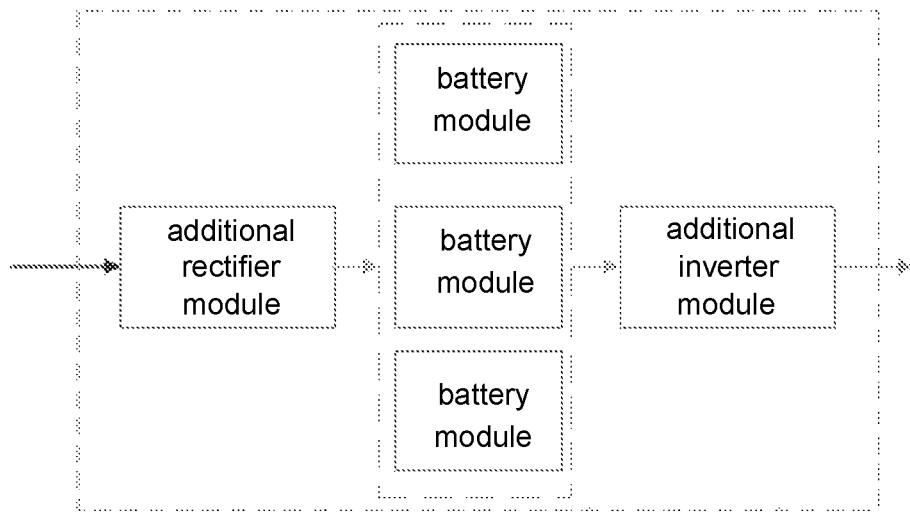
FIG. 3 is a schematic diagram of a third configuration of an energy storage unit used in a fracturing system according to the present disclosure.

FIG. 3 shows a third configuration of energy storage unit. Compared with the energy storage unit shown in FIG. 2, the energy storage unit shown in FIG. 3 further includes an additional inverter module electrically connected between the battery module and the electric supply interface. The additional inverter module can convert direct current output by the battery module into alternating current with constant frequency and voltage or frequency modulation and voltage regulation. Therefore, the energy storage unit according to the third configuration can output alternating current. Correspondingly, the electric supply interface electrically connected with the additional inverter module is an AC electric supply interface.

Figure 4:
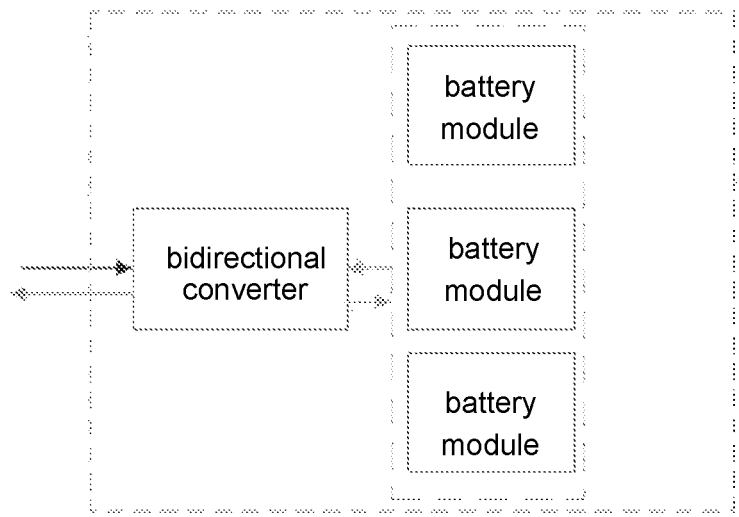
FIG. 4 is a schematic diagram of a fourth configuration of an energy storage unit used in a fracturing system according to the present disclosure.

FIG. 4 shows a fourth configuration of energy storage unit. Compared with the energy storage unit shown in FIG. 1, the energy storage unit shown in FIG. 4 further comprises a bidirectional converter. The charging interface and the electric supply interface of the energy storage unit are respectively electrically connected with the battery module through the bidirectional converter. The bi-directional converter can achieve conversion between DC and AC, control the charging and discharging process of the battery module, realize regulation of active power and reactive power of the electricity grid, and can also directly supply electrical energy to AC load without the electricity grid.

Figure 5:
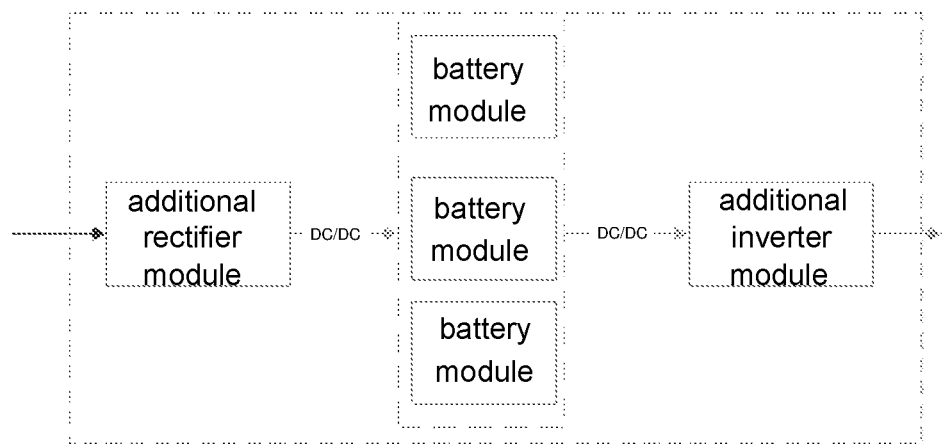
FIG. 5 is a schematic diagram of a fifth configuration of an energy storage unit used in a fracturing system according to the present disclosure.

FIG. 5 shows a fifth configuration of energy storage unit. Compared with the energy storage unit shown in FIG. 3 or FIG. 4, the energy storage unit shown in FIG. 5 further includes a DC/DC converter. The DC/DC converter is arranged in series between the additional rectification module and the battery module as well as the battery module and the additional inverter module. The DC/DC converter can transform and adjust DC voltage input to the battery module as well as DC voltage output from the battery module. Of course, as an alternative embodiment, a DC/DC converter may be provided only between the additional rectification module and the battery module, or only between the battery module and the additional inverter module. In addition, the additional rectifier module and the additional inverter module can be replaced with a bidirectional converter to adjust current characteristics. In addition, it is also possible to omit the additional rectifier module and the additional inverter module with only the DC/DC converter being provided.

Figure 6:
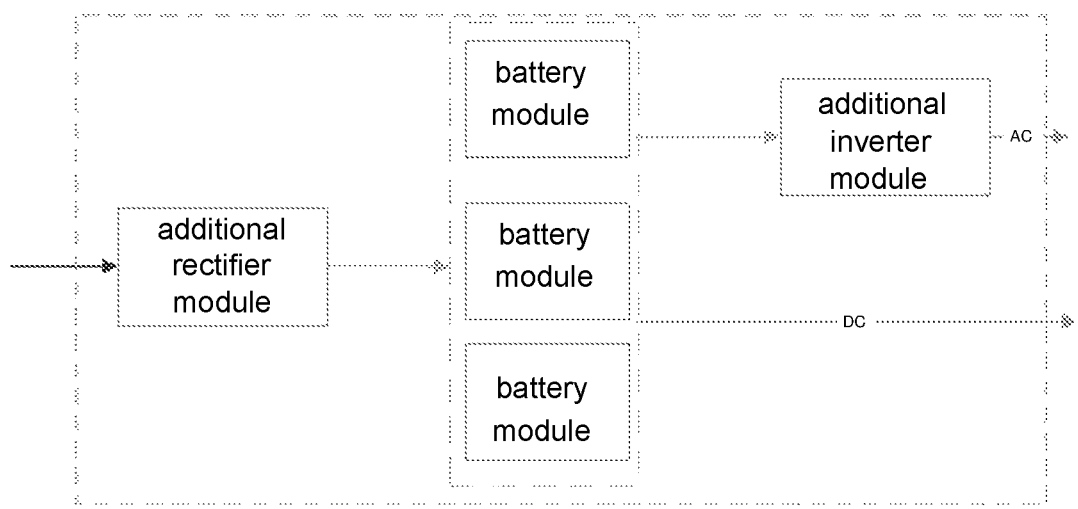
FIG. 6 is a schematic diagram of a sixth configuration of an energy storage unit used in a fracturing system according to the present disclosure.

FIG. 6 shows a sixth configuration of energy storage unit. Compared with the energy storage unit shown in FIG. 3, the energy storage unit shown in FIG. 6 further comprises a DC electric supply interface. The DC electric supply interface is directly electrically connected with the battery module in parallel with the additional inverter module and the AC electric supply interface. Therefore, according to the sixth configuration, the energy storage unit can simultaneously output alternating current and direct current.

FIGS. 7 to 12 respectively show fracturing systems of different embodiments according to the present disclosure. The following is a detailed description with reference to the accompanying drawings.

Figure 7:
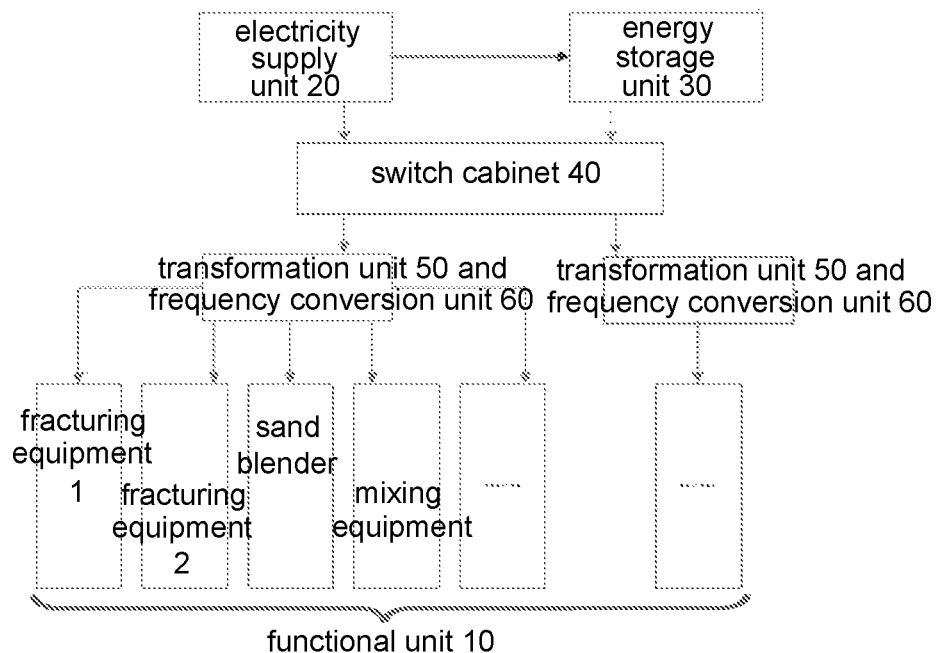
FIG. 7 is a schematic diagram of a fracturing system according to a first embodiment of the present disclosure.

As shown in FIG. 7, in a first embodiment, in addition to a functional unit 10, an electricity supply unit 20, and an energy storage unit 30 described above, fracturing system 100 preferably further comprises a switch cabinet 40, a transformation unit 50 and a frequency conversion unit 60. The switch cabinet 40 is used to centrally control branching, merging, on-off state and the like of electrical connections between various functional devices and/or components from the electricity supply unit 20 to the functional unit 10. It can be understood that when the electricity supply unit 20 and the energy storage unit 30 are connected to the switch cabinet 40 at the same time, the switch cabinet 40 can be interconnected or connected separately. The transformation unit 50 and the frequency conversion unit 60 are located between the switch cabinet 40 and the functional unit 10 which are used for transforming, rectifying and frequency converting current input to the functional unit 10. Wherein, the transformation unit 50 may include a transformer. The frequency conversion unit 60 may include a frequency converter (Variable-frequency Drive, VFD). Wherein, there are respectively at least one transformation unit and one variable frequency unit, preferably two or more groups, so that AC variable-frequency currents with different voltages can be output.

The charging interface of the energy storage unit 30 is electrically connected to a power generation port of the electricity supply unit 20. And the electric supply interface of the energy storage unit 30 is connected with an input end of the switch cabinet to supply electrical energy to the functional unit 10.

Figure 8:
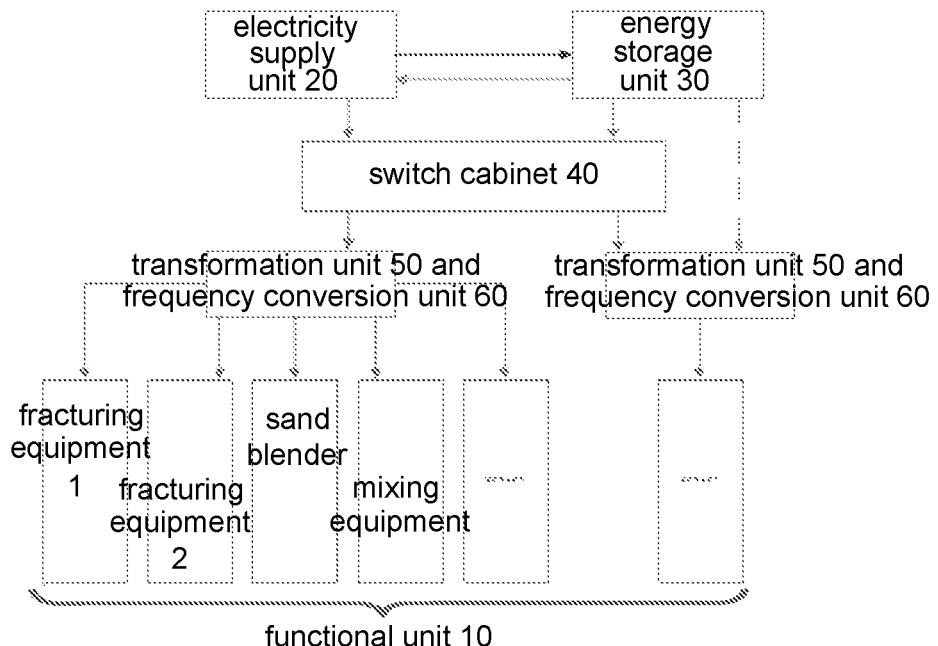
FIG. 8 is a schematic diagram of a fracturing system according to a second embodiment of the present disclosure.

FIG. 8 shows a fracturing system 200 according to a second embodiment of the present disclosure, which is substantially the same as the fracturing system 100 of the first embodiment shown in FIG. 7. The difference is that, in the fracturing system 200, the electricity supply unit 20 includes a generator set, such as a turbine generator set or the like. The electric supply interface of the energy storage unit 30 may be electrically connected to a power consumption port of the electricity supply unit 20. Thus, the energy storage unit 30 can not only supply electrical energy to the functional unit 10 but also to the electricity supply unit 20. For example, before the generator set is started, the energy storage unit 30 can provide the electricity supply unit 20 with the electrical energy required to start; or when the generator set is shut down, the energy storage unit 30 can provide the necessary electrical energy to the generator set to ensure normal running of heat dissipation system or lubrication system of the generator set.

In addition, in the fracturing system 200, the energy storage unit 30 may also be directly electrically connected to the functional unit 10 through the transformation unit 50 and the frequency conversion unit 60 without passing through the switch cabinet 40. In this case, the on-off state of the electrical connection between the energy storage unit 30 and the functional unit 10 can be controlled by the switch of the energy storage unit 30 itself.

Figure 9:
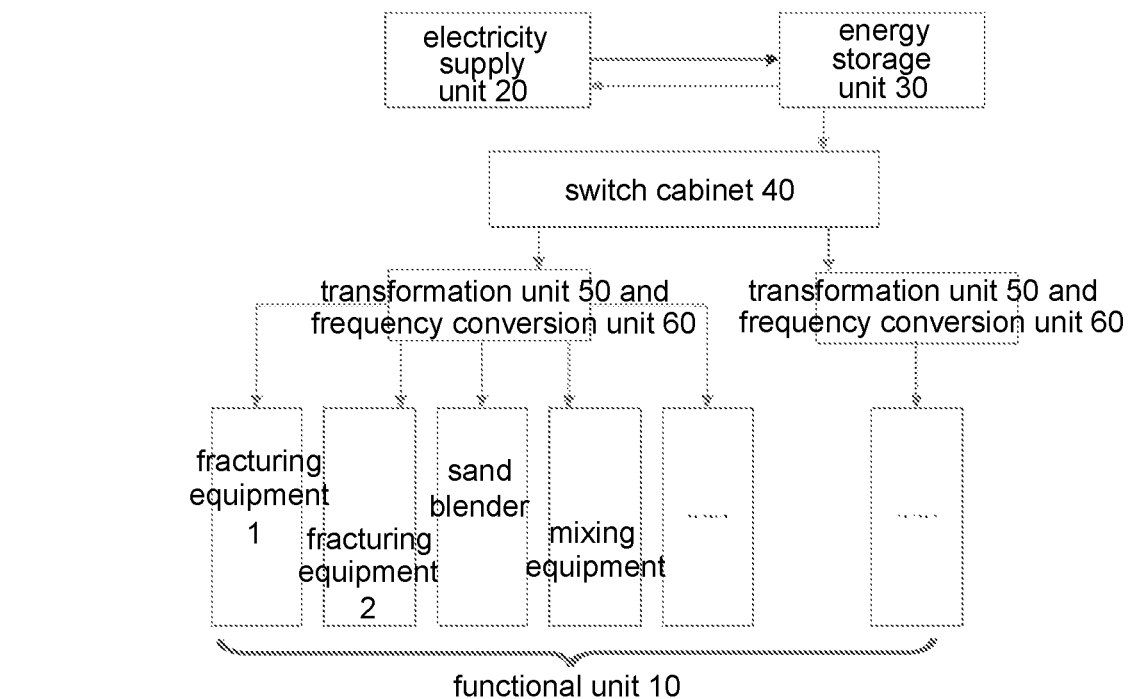
FIG. 9 is a schematic diagram of a fracturing system according to a third embodiment of the present disclosure.

FIG. 9 shows a fracturing system 300 according to a third embodiment of the present disclosure, which is substantially the same as the fracturing system 200 of the second embodiment shown in FIG. 8. The difference is that, in the fracturing system 300, the energy storage unit 30 is directly electrically connected with the switch cabinet 40, while the electricity supply unit 20 is electrically connected with the switch cabinet 40 via the energy storage unit 30. Therefore, the energy storage unit 30 is used to provide electrical connection from the electricity supply unit 20 to the functional unit 10 in addition to the function of storing electrical energy. In other words, in the fracturing system 300, the electricity supply unit 20, the energy storage unit 30 and the functional unit 10 are connected in series.

Figure 10:
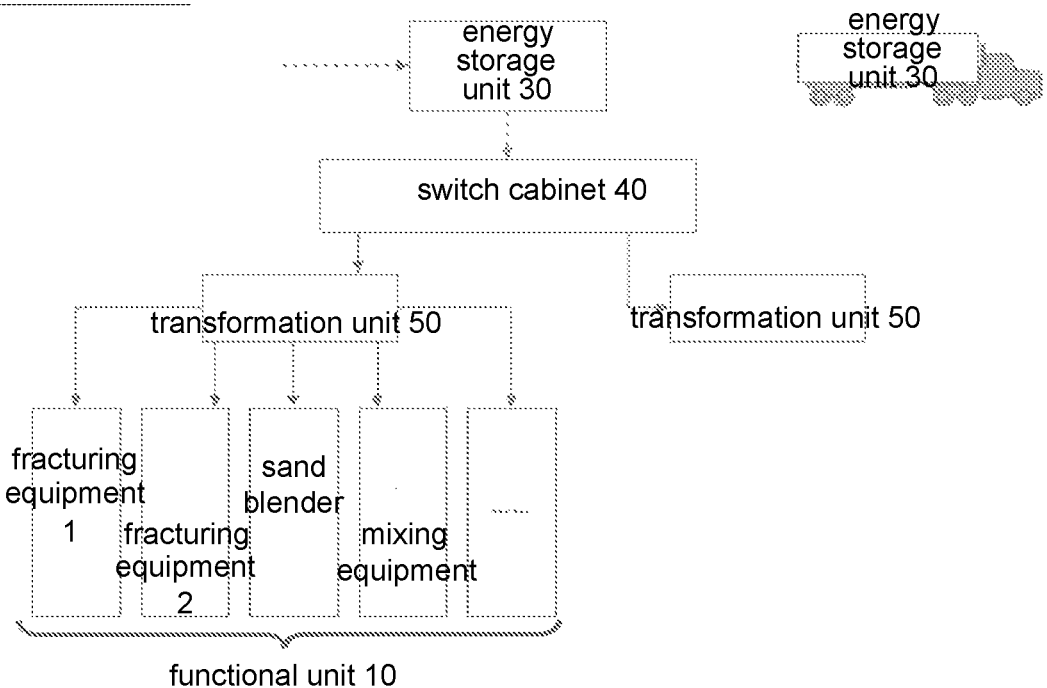
FIG. 10 is a schematic diagram of a fracturing system according to a fourth embodiment of the present disclosure.

FIG. 10 shows a fracturing system 400 according to a fourth embodiment of the present disclosure, wherein the electricity supply unit is omitted. In the fracturing system 400, the energy storage unit 30 may be moved by a carrier such as a truck or trailer. Such an arrangement may allow a power station to be arranged outside the well site, and the energy storage unit 30 may be transported outside the well site for centralized charging by means of a carrier.

Figure 11:
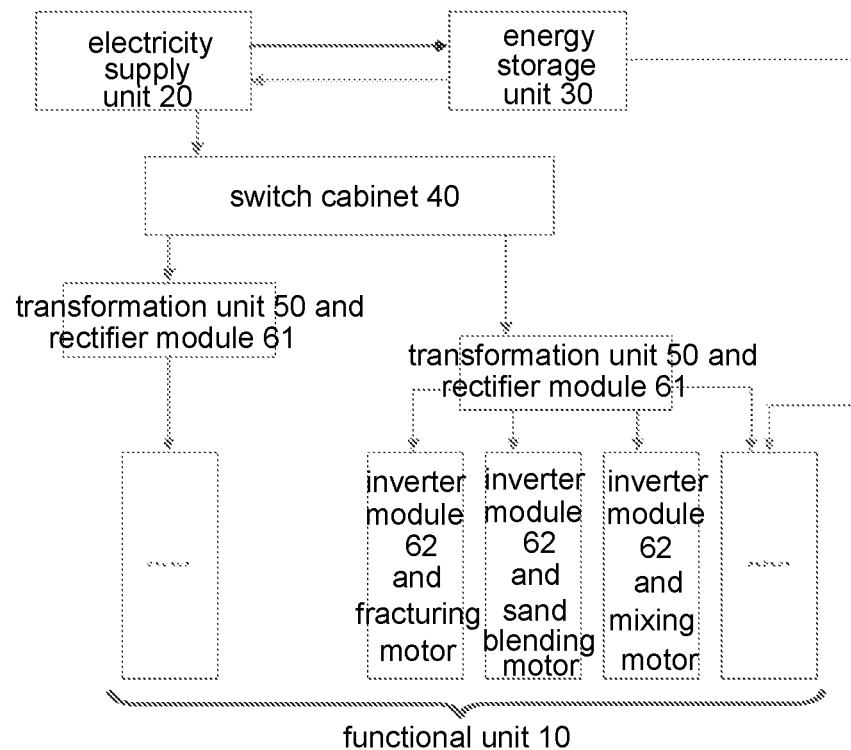
FIG. 11 is a schematic diagram of a fracturing system according to a fifth embodiment of the present disclosure.

FIG. 11 shows a fracturing system 500 according to a fifth embodiment of the present disclosure, which is substantially the same as the fracturing system 200 of the second embodiment shown in FIG. 8. The difference is that, in fracturing system 500, the frequency conversion unit is divided into a rectifier module 61 and an inversion module 62. Wherein the rectifier module 61 and the transformation unit 50 are integrated as a single device, and can supply rectified current to sand blender, mixing equipment, fracturing equipment, and other devices of the functional unit 10. In addition, sand blender, mixing equipment, fracturing equipment and other devices all include inverters and electric motors. The inverter of each device constitutes the inverter module 62. The rectifier module 61 may be electrically connected to the inverter module 62 through a DC bus. This arrangement can improve the flexibility of the arrangement of each unit in the fracturing system 500.

The energy storage unit 30 outputs direct current, and its electric supply interface bypasses the switch cabinet 40, the transformation unit 50 and the rectifier module 61, and is directly electrically connected to inverters of various devices of the functional unit 10 or directly connected to DC buses.

Figure 12:
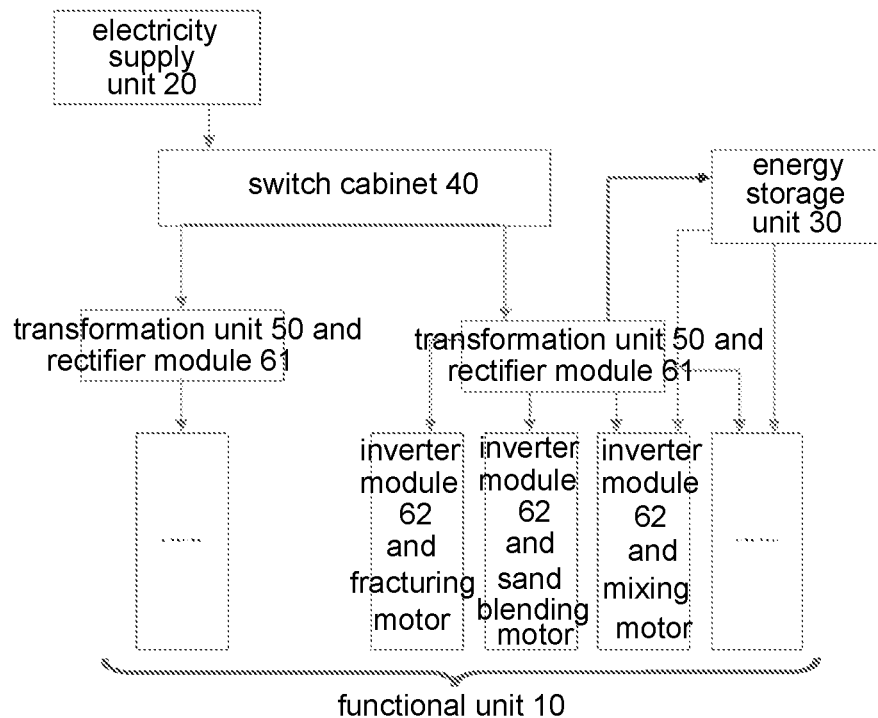
FIG. 12 is a schematic diagram of a fracturing system according to a sixth embodiment of the present disclosure.
Figure 13:
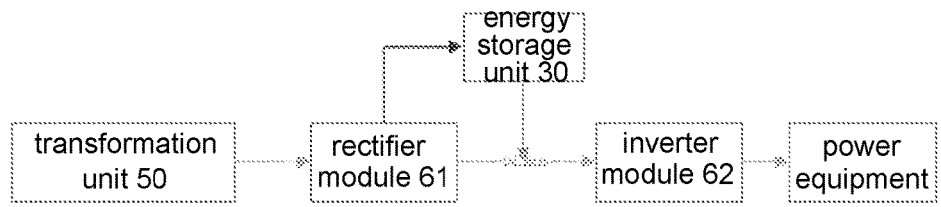
FIG. 13 is a schematic diagram of another connection configuration of the energy storage unit of the fracturing system shown in FIG. 12.

FIG. 12 shows a fracturing system 600 according to a sixth embodiment of the present disclosure, which is substantially the same as the fracturing system 500 of the fifth embodiment shown in FIG. 11. The difference is that, in fracturing system 600, the charging interface of the energy storage unit 30 is electrically connected to a rectifier module 61 rather than directly connected with the electricity supply unit 20. In this way, current input to the energy storage unit 30 is rectified DC current, so that the additional rectifier module can be omitted from the energy storage unit 30. Similar to the fracturing system 500 according to the fifth embodiment, the electric supply interface of the energy storage unit 30 is directly electrically connected to inverters of various devices of the functional unit 10, or as shown in FIG. 13, is directly electrically connected to a DC bus between the rectifier module 61 and the inverter module 62.

Figure 14:
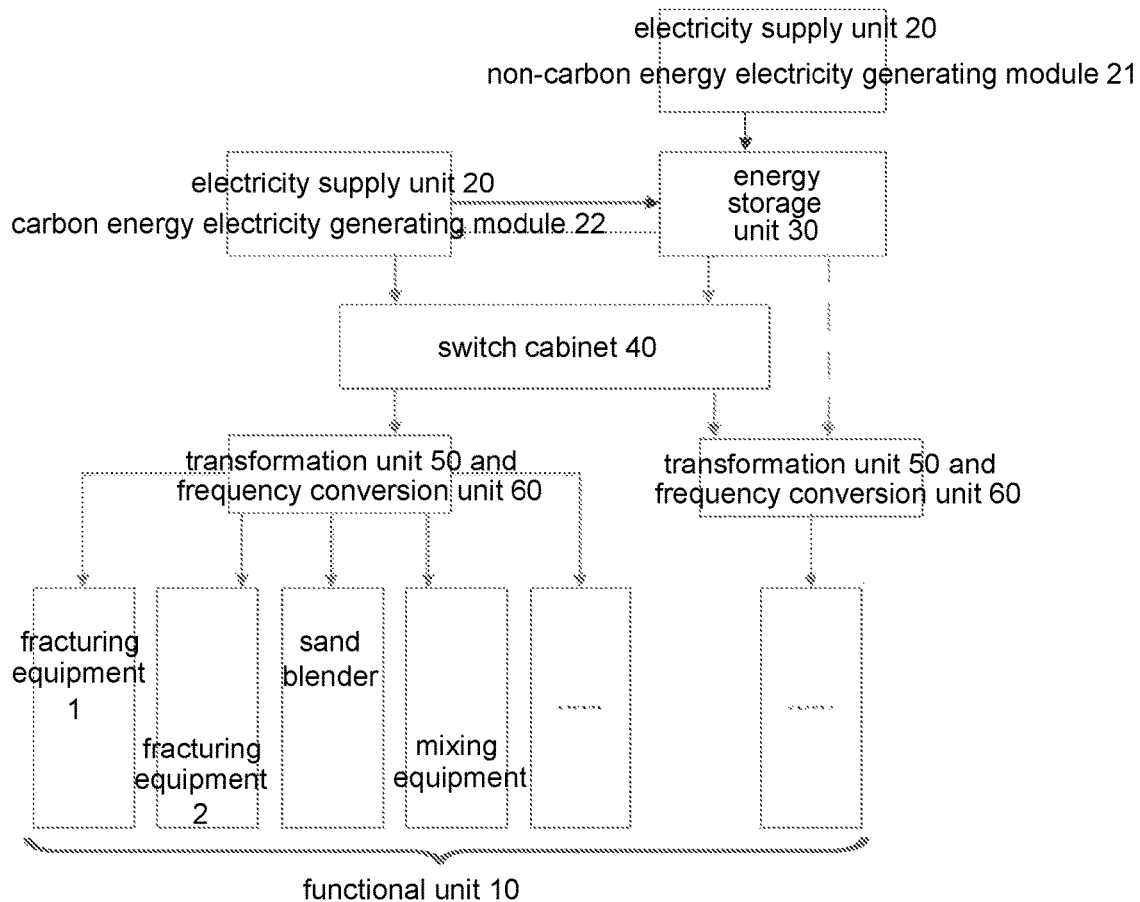
FIG. 14 is a schematic diagram of a fracturing system according to a seventh embodiment of the present disclosure.

FIG. 14 shows a fracturing system 700 according to a seventh embodiment of the present disclosure. In the seventh embodiment, the electricity supply unit 20 may only comprises a non-carbon energy electricity generating module 21, such as solar energy electricity generating equipment, wind turbine electricity generating equipment, hydrogen fuel cell, etc., so that the fracturing system 700 is completely powered by the non-carbon energy. This can reduce the use of carbon energy electricity generating equipment, thus reducing carbon emissions and achieving the effects of energy conservation and environmental protection.

More specifically, on the basis of comprising the non-carbon energy electricity generating module 21, the electricity supply unit 20 may also comprise a carbon energy electricity generating module 22, such as a natural gas fuel cell, an internal combustion engine electricity generating device, etc. When the energy storage unit 30 needs to be charged, it can be selectively charged by the non-carbon energy electricity generating module 21 or the carbon energy electricity generating module 22. Such an arrangement, on the one hand, can maximize the use of non-carbon energy electricity generating equipment for electricity generation, thereby reducing carbon emissions; On the other hand, it can solve the problem of insufficient continuity of power supplied from non-carbon energy sources. When non-carbon energy sources cannot provide electrical energy (for example, when solar energy electricity generating equipment cannot be used for night charging), the carbon energy electricity generating module 22 can be flexibly selected to supply electrical energy or charge the energy storage unit 30.

Specifically, as shown in FIG. 14, the non-carbon energy electricity generating module 21 and the carbon energy electricity generating module 22 are respectively electrically connected with the energy storage unit 30 to charge it. The non-carbon energy electricity generating module 21 is electrically connected to the switch cabinet 40 via the energy storage unit 30, and the carbon energy electricity generating module 22 is directly electrically connected to the switch cabinet 40 to respectively supply power to the functional units 10. In addition, the electric supply interface of the energy storage unit 30 is also electrically connected with a power consumption port of the carbon energy electricity generating module 22 to supply electricity generating to the carbon energy electricity generating module 22.

Figure 15:
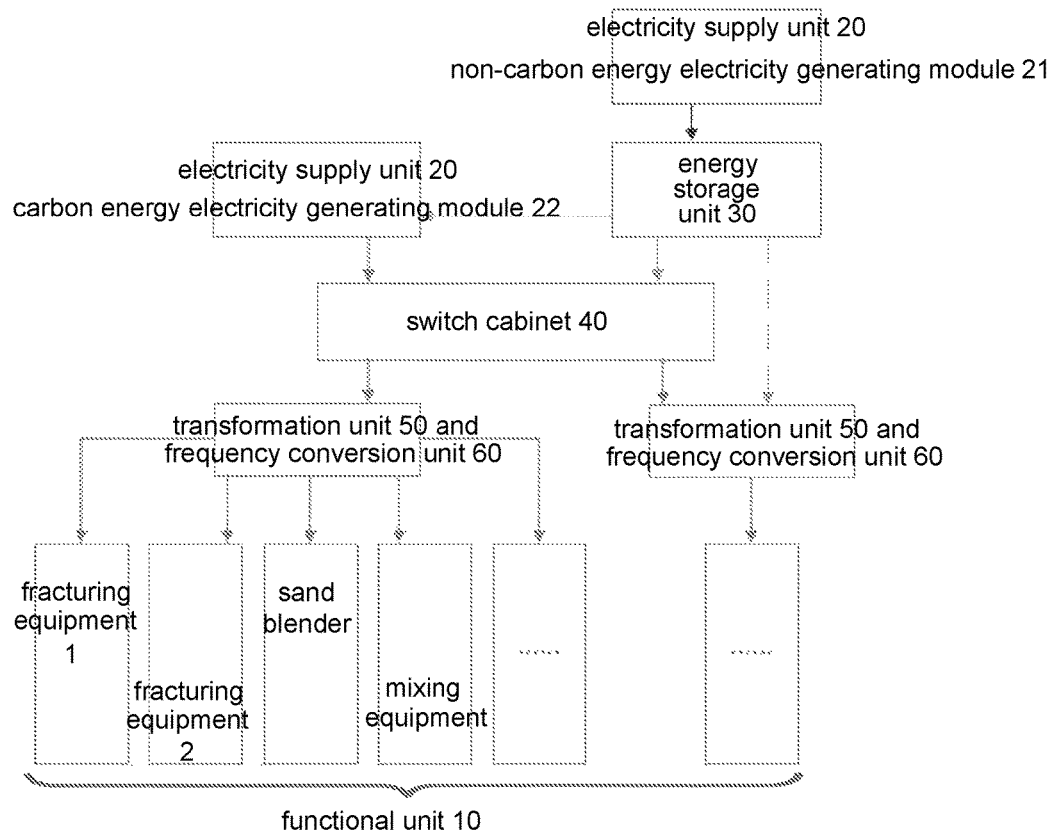
FIG. 15 is a schematic diagram of a modification of the fracturing system according to the seventh embodiment of the present disclosure.

FIG. 15 shows a modification of the fracturing system 700 of the seventh embodiment. In this modification, the charging interface of the energy storage unit 30 can only be electrically connected to the non-carbon energy electricity generating module 21. That is, the energy storage unit 30 is only charged by the non-carbon energy electricity generating module 21. However, an electricity generating port of the carbon energy electricity generating module 22 is only electrically connected to the switch cabinet 41, and a power consumption port of the carbon energy electricity generating module 22 is electrically connected to the electric supply interface of the energy storage unit 30. As a result, the carbon energy electricity generating module 22 supplies electrical energy only to the functional unit 10, and the energy storage unit 30 can supply electrical energy to the carbon energy electricity generating module 22 when necessary. It can be understood that there is no correspondence between the different configuration of energy storage units in the foregoing description and various embodiments of fracturing systems. Under the premise of adaptation, one configuration of energy storage unit can be applied to fracturing systems of different embodiments, for example, the energy storage unit shown in FIG. 3 can be applied to fracturing system 100 according to the first embodiment, fracturing system 200 according to the second embodiment, and fracturing system 300 according to the third embodiment, etc. In addition, a fracturing system may use different configurations of energy storage units, for example, the fracturing system 100 according to the first embodiment may use the energy storage units shown in FIGS. 2, 3 and 4.

The fracturing system provided by the present disclosure comprises an energy storage unit, the energy storage unit of the fracturing system can store redundant electrical energy of the electricity supply unit and supply electrical energy to the whole fracturing system when needed, playing the role of energy storage as well as peak shaving so that the generator set and the like can keep economic working condition for a long time, thus the system can be safe, stable, and achieve improved efficiency and economy. In addition, the present disclosure makes it possible to generate electricity from non-carbon sources for fracturing operations. It minimizes the use of internal combustion engines thus is more environment-friendly. The present disclosure can also reduce the number of generator sets and the space occupied by which so as to reduce the operation cost of fracturing operations.

The foregoing description on the various embodiments of the present disclosure has been presented to those skilled in the relevant fields for purposes of illustration, but are not intended to be exhaustive or limited to a single embodiment disclosed herein. As aforementioned, many substitutions and variations will be apparent to those skilled in the art. Therefore, although some alternative embodiments have been described above, those skilled in the art can still envision or develop other embodiments much more easily. The present disclosure is intended to cover all substitutions, modifications and variations of the present disclosure as described herein, as well as other embodiments falling into the spirits and scope of the present disclosure.

We claim:

1. A fracturing system, comprising:
   an energy storage comprising a battery and a switch;
   an electricity supplier;
   a switch cabinet;
   a plurality of transformers;
   a plurality of rectifiers; and
   a plurality of inverters respectively corresponding to and connected with a plurality of fracturing apparatuses, wherein:
   the electricity supplier is connected with the switch cabinet;
   the switch cabinet is connected with the plurality of transformers;
   the plurality of transformers are respectively connected with the plurality of rectifiers;
   each of the plurality of rectifiers is directly connected with a DC bus and the energy storage;
   the DC bus is directed connected to the plurality of inverters;
   the energy storage is directly electrically connected with the DC bus or each of the plurality of inverters;
   the electricity supplier is configured to power the plurality of fracturing apparatuses; and
   the energy storage is electrically connected with the electricity supplier, the energy storage being configured to store electrical energy from the electricity supplier and power the plurality of fracturing apparatuses.

2. The fracturing system according to claim 1, wherein the electricity supplier comprises a generator set, and the energy storage is configured to supply electrical energy to the generator set.

3. The fracturing system according to claim 1, wherein:
   the energy storage is electrically connected with the plurality of fracturing apparatuses; and
   the plurality of fracturing apparatuses comprise mixing equipment, sand blender, sand conveyor, fracturing equipment, cementing equipment, batch mixing equipment, or drilling equipment.

4. The fracturing system according to claim 1, wherein the plurality of transformers are integrated with the plurality of rectifiers, and the plurality of inverters are respectively integrated with the plurality of fracturing apparatuses.

5. The fracturing system according to claim 1, wherein a charging interface of the energy storage is electrically connected with the plurality of rectifiers.

6. The fracturing system according to claim 1, wherein the electricity supplier, the energy storage, and the plurality of fracturing apparatuses are electrically connected in series.

7. The fracturing system according to claim 1, wherein:
the electricity supplier comprises at least one of an electricity grid, a diesel generator, a turbine generator, a gas generator, a nuclear reactor generator, photovoltaic electricity generating equipment, a wind power plant, and a fuel cell; and
the energy storage further comprises a battery management module.

8. The fracturing system according to claim 1, wherein the energy storage further comprises a charging interface and an additional rectifier electrically connected between the charging interface and the battery.

9. The fracturing system according to claim 1, wherein the energy storage further comprises an additional inverter and an electric supply interface, the electric supply interface comprises an AC electric supply interface, and the additional inverter is electrically connected between the battery and the AC electric supply interface.

10. The fracturing system according to claim 1, wherein the energy storage further comprises a charging interface, and an electric supply interface, and wherein a DC/DC converter electrically connected between the charging interface and the battery and/or between the battery and the electric supply interface.

11. The fracturing system according to claim 1, wherein the energy storage further comprises an electric supply interface and wherein the electric supply interface comprises a DC electric supply interface electrically connected with the battery directly.

12. The fracturing system according to claim 1, wherein the energy storage comprises a bidirectional converter, a charging interface, and an electric supply interface, and wherein the charging interface and the electric supply interface are respectively electrically connected with the battery via the bidirectional converter.

13. The fracturing system according to claim 1, further comprising a centralized control in communication connection with the plurality of fracturing apparatuses and the energy storage via a wired and/or a wireless connection, wherein the centralized control is configured to monitor and/or control working parameters of the plurality of fracturing apparatuses and the energy storage.

14. The fracturing system according to claim 13, wherein the centralized control is configured to send out alarm information and/or reduce a power consumption of the plurality of fracturing apparatuses when a voltage, current, and/or frequency of power supply to the plurality of fracturing apparatuses deviate from a predetermined range.

15. The fracturing system according to claim 13, wherein the centralized control is configured to automatically control the energy storage to supply electrical energy to the electricity supplier, the centralized control, and/or the plurality of fracturing apparatuses when power supply from the electricity supplier is cut off.

16. The fracturing system according to claim 15, wherein the centralized control is further configured to send out prompt information including working duration information that is based on (i) a remaining battery of the energy storage and (ii) a working power of the plurality of fracturing apparatuses.

17. The fracturing system according to claim 13, wherein the centralized control is configured to control the energy storage to:
charge a portion of all batteries of the energy storage and supply electrical energy from a different portion of the batteries of the energy storage at the same time.

18. The fracturing system according to claim 13, wherein the centralized control is configured to cut off an electrical connection for charging the energy storage when a voltage, current, and/or frequency for charging the energy storage deviate from a predetermined range.

19. The fracturing system according to claim 1, wherein the energy storage is arranged on a carrier.

20. The fracturing system according to claim 1, further comprising a centralized control in communication connection with the electricity supplier and the energy storage and configured to:
control the electricity supplier to supply power to the plurality of fracturing apparatuses alone; or
control the energy storage to supply power to the plurality of fracturing apparatuses alone; or
control both the electricity supplier and the energy storage to both supply power to the plurality of fracturing apparatuses.

* * * * *